(12) United States Patent
Sugimoto

(10) Patent No.: US 6,394,896 B2
(45) Date of Patent: May 28, 2002

(54) AMUSEMENT GAME SYSTEM AND A COMPUTER-READABLE STORAGE MEDIUM

(75) Inventor: Norihide Sugimoto, Nagoya (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/748,357

(22) Filed: Dec. 26, 2000

(30) Foreign Application Priority Data

Jan. 14, 2000 (JP) ....................................... 2000-010157

(51) Int. Cl.⁷ ............................................... A63F 13/00
(52) U.S. Cl. ............................... 463/3; 463/30; 463/37
(58) Field of Search ............................ 463/1–3, 40–43; 273/108.2, 317.2, 459–461; 473/131, 409; 434/252

(56) References Cited

U.S. PATENT DOCUMENTS

| 5,947,819 A | * | 9/1999 | Ohshima | 463/22 |
| 6,045,446 A | * | 4/2000 | Ohshima | 463/22 |
| 6,217,444 B1 | * | 4/2001 | Kataoka et al. | 463/3 |

FOREIGN PATENT DOCUMENTS

| JP | 08289981 | 11/1996 | ............. | A63F/9/22 |

OTHER PUBLICATIONS

Links 386 CD Players Manual, 1995, Access Software, Inc., pp. 1–87.*
(Document 1) MS Golf 3–Click Shot–Tradition of Augusta (with English translation).
(Document 3) "R–Type" (with English translation).

* cited by examiner

Primary Examiner—Joe H. Cheng
Assistant Examiner—Scott E. Jones
(74) Attorney, Agent, or Firm—Jordan and Hamburg LLP (57) ABSTRACT

A player inputs the first, second and third instructions utilizing an input device, to move an object toward a target in a virtual field. A power for moving the object is displayed by a graph and a cursor within a range not exceeding the maximum power value. The cursor moves according to lapsed time after the first instruction detection. When the second instruction is given, the power is determined based on lapsed time from the first instruction detection to the second instruction detection. The player perceives the cursor reaching the standard position and inputs the third instruction. Factors for the object direction is determined according to the timing at which the cursor actually reaches the standard position and the player inputs the third instruction. The continuous input of the second instruction, exceeding a prescribed period, causes the power to increase beyond its maximum.

12 Claims, 7 Drawing Sheets

BEST TIMING POINT

AMUSEMENT GAME SYSTEM AND A COMPUTER-READABLE STORAGE MEDIUM

BACKGROUND OF THE INVENTION

1. Field of the Invention

The present invention relates to a kind of amusement game system such as a throwing amusement game, a golf amusement game or the like, which can move an object in a virtual field.

2. Description of the Related Art

There is known as such a kind of amusement game, for example, a golf amusement game by which a player can have a virtual reality experience in playing golf utilizing a computer. According to the conventional golf amusement game, a player selects a golf club by preference and hits a ball with it (such hit will also be hereinafter referred to as "shot") on a virtual golf course so as to cause a golf play to progress in a virtual reality manner.

A player can control power, timing and the like for hitting a virtual ball by manipulating a controller or the like, which is attached to an amusement game system, when making a shot. With respect to the most typical procedure for making a shot, the power of shot is expressed by a gauge displayed on a game screen. For example, the game screen has the gauge displayed thereon, which indicates the power of from 0% to 100%, so that a cursor in the gauge can move from the position of 0% to 100% in response to a starting operation for the shot by the player. The player can determine the power of shot by operating the controller when the cursor reaches a prescribed position. The amusement game system-side computer determines a driving distance and a direction of the virtual ball in accordance with the power and timing thus determined so as to move the ball on the virtual golf course. The player can make a shot with a prescribed power to make progress of the play of golf.

The conventional golf amusement game is designed so as not to be capable of making a shot with power exceeding 100%, which is previously set in the amusement game side. A usual proper selection of the golf club permits to increase the driving distance of the ball. A shot with the power of 100% has to be made with the use of a driver, when the maximum driving distance is required. It is however impossible to obtain the distance exceeding the above-mentioned maximum driving distance.

However, in the actual golf play, a further distance drive of a ball than the other player leads to one of great pleasures. It is preferable to provide a device for making a further drive of a ball than the normal state also in a golf amusement game, when the player wishes.

SUMMARY OF THE INVENTION

An object of the present invention, which has been made in view of the above-described matters, is to provide an amusement game system, in which a device for increasing further the movement distance of an object than the normally set distance is given to a kind of amusement game system for moving the object on a virtual field.

In order to attain the aforementioned object, an amusement game system of the present invention comprises:

a display device for a picture;

an input device for outputting signals according to operation by a player; and a control device for causing an amusement game to progress and displaying the picture according to a progress of the amusement game on a screen of said display device, said amusement game including a step for moving an object in a virtual field while making reference to output from said input device, wherein:

said control device comprises:

a first-instruction detection device for detecting first instruction, which has been input by the player with a use of said input device;

a movement power display device for displaying movement power of said object within a range up to a predetermined maximum value of movement power by means of a graph and a cursor movable on said graph;

a first cursor-movement device for moving said cursor on said graph in a direction indicating said maximum value of movement power in accordance with a lapse of time from a point of time when said first instruction has been detected;

a second-instruction detection device for detecting second instruction, which has been input by the player with the use of said input device;

a movement power determination device for determining the movement power of said object on a basis of a lapse of time from the point of time when said first instruction has been detected to a point of time when said second instruction has been detected;

a movement device for moving said object in the virtual field in accordance with the movement power thus determined; and a movement power increase device for increasing said movement power beyond said maximum value of movement power when said second instruction is continuously input for at least a prescribed period of time.

According to the amusement game system of the present invention having the above-described structural elements, a player inputs the first and second instructions with the use of the input device in order to move the object on the virtual field. The movement power for moving the object is displayed in the form of combination of the graph with the cursor within a range, which does not exceed the maximum value of movement power. The cursor moves in accordance with the lapse of time after detection of the first instruction so as to make an optical transmission of change in movement power to the player. When the second instruction is given, the movement power is determined on the basis of the lapse of time between the point of time when the first instruction has been detected and the point of time when the second instruction has been detected. The movement power is increased beyond the maximum value of movement power when the second instruction is continuously input for at least a prescribed period of time. Accordingly, the continuous input of the second instruction permits to increase further the movement power beyond the maximum movement power in the normal state. It is therefore possible to obtain the further movement distance than the normal state in a kind of amusement game in which the object can be moved by an action such as throwing, kicking, hitting of the object to send it flying.

The amusement game system may further comprises:

a second cursor-movement device for moving said cursor toward a standard position on said graph, after detection of said second instruction;

a third-instruction detection device for detecting third instruction, which has been input by the player with the use of said input device; and a movement direction factor determination device for determining a factor associated with a movement direction of said object, in accordance with timing at which said cursor reaches said standard position and with timing at which said third instruction is input, said movement device moving said object in said virtual field in accordance with said movement power as determined and said factor associated with the movement direction of said object.

According to the amusement game system as described above, the cursor further moves in turn toward the standard position on the graph, after completion of input of the second instruction by the player. The player inputs the third instruction, at the time when he perceives that the cursor reaches the standard position. The factor associated with the movement direction of the object is determined in accordance with the timing at which the cursor actually reaches the standard position and with the timing at which the third instruction is input by the player. The object moves in the virtual field in accordance with the movement power as determined and the factor associated with the movement direction of the object. It is therefore possible to make an accurate movement of the object toward the position or direction of target in progress of the amusement game.

The above-mentioned movement power increase device may determine an increased amount of said movement power in accordance with a period of time during which said second instruction is continuously input. According to this feature, the player can control the increased amount of movement power in accordance with the period of time during which the second instruction is continuously input, thus permitting increase in movement power by a desired level.

The above-mentioned movement power increase device may increase a value of said movement power by the increased amount thereof corresponding to said period of time, when a period of time during which said second instruction is continuously input, exceeds said prescribed period of time. According to this feature, it is possible to provide the upper limit for the increased amount of movement power.

The above-mentioned movement power increase device may increase said movement power only in case where said second instruction is input when said cursor indicates a power value between a predetermined power value and said maximum value of movement power. According to this feature, it is possible to adjust difficulty of operation to increase the movement power.

In case where said movement power increase device increases the movement power, said second cursor-movement device may move said cursor in a higher velocity than when said movement power increase device does not increase the movement power. According to this feature, it is possible to make determination of movement direction of the object difficult so as to enhance the strategy of amusement game.

The above-mentioned second cursor-movement device may increase a movement velocity of said cursor at a rate corresponding to the amount of the movement power, which is increased by said movement power increase device. According to this feature, adjustment of the movement direction becomes difficult according as the increased amount of movement power becomes larger, thus permitting to enhance further the strategy of amusement game.

There may be adapted a structure in which said graph indicates a power value within a range of from 0% to 100%, said maximum value of movement power corresponds to the power value of 100% and said movement power increase device increases said movement power beyond 100%. According to this feature, it is possible to grasp the movement power in a ratio even when different kinds of procedures are taken to move the object, thus leading to easy adjustment and determination of the movement power by the player.

The above-mentioned movement power display device may display a value of the movement power after increase therein on said graph, when said movement power increase device increases the movement power to at least 100%. According to this feature, it is possible for the player to recognize easily the movement power as increased, by means of its value in an optical manner.

An amusement game system of the present invention comprises:

a display device for a picture;

an input device outputting signals according to operation by a player; and a control device for causing a golf amusement game to progress and displaying the picture according to a progress of the amusement game on a screen of said display device, said golf amusement game including a step for hitting a ball to send it flying toward a target in a virtual field while making reference to the output of said input device, wherein:

said control device comprises:

a first-instruction detection device for detecting first instruction, which has been input by the player with a use of said input device;

a hit power display device for displaying hit power of said ball within a range up to a predetermined maximum value of hit power by means of a graph and a cursor movable on said graph;

a first cursor-movement device for moving said cursor on said graph in a direction indicating said maximum value of hit power in correspondence with a lapse of time from a point of time when said first instruction has been detected;

a second-instruction detection device for detecting second instruction, which has been input by the player with the use of said input device;

a hit power determination device for determining the hit power of said ball on a basis of a lapse of time from the point of time when said first instruction has been detected to a point of time when said second instruction has been detected;

a movement device for moving said ball in the virtual field in accordance with the hit power thus determined; and a hit power increase device for increasing said hit power beyond said maximum value of hit power when said second instruction is continuously input for at least a prescribed period of time.

According to the amusement game system of the present invention having the above-described structural elements, a player inputs the first and second instructions with the use of the input device in order to send the ball flying on the virtual field. The hit power for sending the ball flying is displayed in the form of combination of the graph with the cursor within a range, which does not exceed the maximum value of hit power. The cursor moves in accordance with the lapse of time after detection of the first instruction so as to make an optical transmission of change in hit power to the player. When the second instruction is given, the hit power is determined on the basis of the lapse of time between the point of time when the first instruction has been detected and the point of time when the second instruction has been detected. The hit power is increased beyond the maximum value of hit power when the second instruction is continuously input for at least a prescribed period of time. Accordingly, the continuous input of the second instruction permits to increase further the hit power beyond the maximum hit power in the normal state. It is therefore possible to obtain the further driving distance than the normal state in a golf amusement game.

The above-mentioned amusement game system may further comprises:

a second cursor-movement device for moving said cursor toward a standard position on said graph, after detection of said second instruction;

a third-instruction detection device for detecting third instruction, which has been input by the player with the use of said input device; and  a hit direction factor determination device for determining a factor associated with a hit direction of said ball, in accordance with timing at which said cursor reaches said standard position and with timing at which said third instruction is input,  said movement device moving said ball in said virtual field in accordance with said hit power as determined and said factor associated with the hit direction of said ball.

According to the amusement game system as described above, the cursor further moves in turn toward the standard position on the graph, after completion of input of the second instruction by the player. The player inputs the third instruction, at the time when he perceives that the cursor reaches the standard position. The factor associated with the hit direction of the ball is determined in accordance with the timing at which the cursor actually reaches the standard position and with the timing at which the third instruction is input by the player. The ball moves in the virtual field in accordance with the hit power as determined and the factor associated with the hit direction of the ball. It is therefore possible to make an accurate drive of the ball toward the position or direction of target in progress of the golf amusement game.

A computer-readable storage medium of the present invention comprises a program stored therein, said program causing an amusement game to progress and displaying a picture according to a progress of the amusement game on a screen of a display device, said amusement game including a step for moving an object in a virtual field while making reference to output from an input device of an amusement game apparatus,  wherein:

said program causes a computer provided in said amusement game apparatus to function respectively as:

a first-instruction detection device for detecting first instruction, which has been input by a player with a use of said input device;

a movement power display device for displaying movement power of said object within a range up to a predetermined maximum value of movement power by means of a graph and a cursor movable on said graph;

a first cursor-movement device for moving said cursor on said graph in a direction indicating said maximum value of movement power in accordance with a lapse of time from a point of time when said first instruction has been detected;

a second-instruction detection device for detecting second instruction, which has been input by the player with the use of said input device;

a movement power determination device for determining the movement power of said object on a basis of a lapse of time from the point of time when said first instruction has been detected to a point of time when said second instruction has been detected;

a movement device for moving said object in the virtual field in accordance with the movement power thus determined; and   a movement power increase device for increasing said movement power beyond said maximum value of movement power when said second instruction is continuously input for at least a prescribed period of time.

A computer-readable storage medium of the present invention comprises a program stored therein, said program causing a golf amusement game to progress and displaying a picture according to a progress of the amusement game on a screen of a display device, said golf amusement game including a step for hitting a ball to send it flying toward a target in a virtual field while making reference to output from an input device of an amusement game apparatus,  wherein:

said program causes a computer provided in said amusement game apparatus to function respectively as:

a first-instruction detection device for detecting first instruction, which has been input by a player with a use of said input device;

a hit power display device for displaying hit power of said ball within a range up to a predetermined maximum value of hit power by means of a graph and a cursor movable on said graph;

a first cursor-movement device for moving said cursor on said graph in a direction indicating said maximum value of hit power in accordance with a lapse of time from a point of time when said first instruction has been detected;

a second-instruction detection device for detecting second instruction, which has been input by the player with the use of said input device;

a hit power determination device for determining the hit power of said ball on a basis of a lapse of time from the point of time when said first instruction has been detected to a point of time when said second instruction has been detected;

a movement device for moving said ball in the virtual field in accordance with the hit power thus determined; and   a hit power increase device for increasing said hit power beyond said maximum value of hit power when said second instruction is continuously input for at least a prescribed period of time.

According to the storage media of the present invention, it is possible to cause the computer to function as the control device in the amusement game system of the present invention by reading the program by means of the computer so as to make execution of the program. The storage media may include magnetic storage medium, optical storage medium, photo-electro-magnetic storage medium, semiconductor storage element and other storage device.

DETAILED DESCRIPTION OF THE PREFERRED EMBODIMENTS

Now, preferred embodiments of the present invention will be described with reference to the accompanying drawings.

Figure 1:
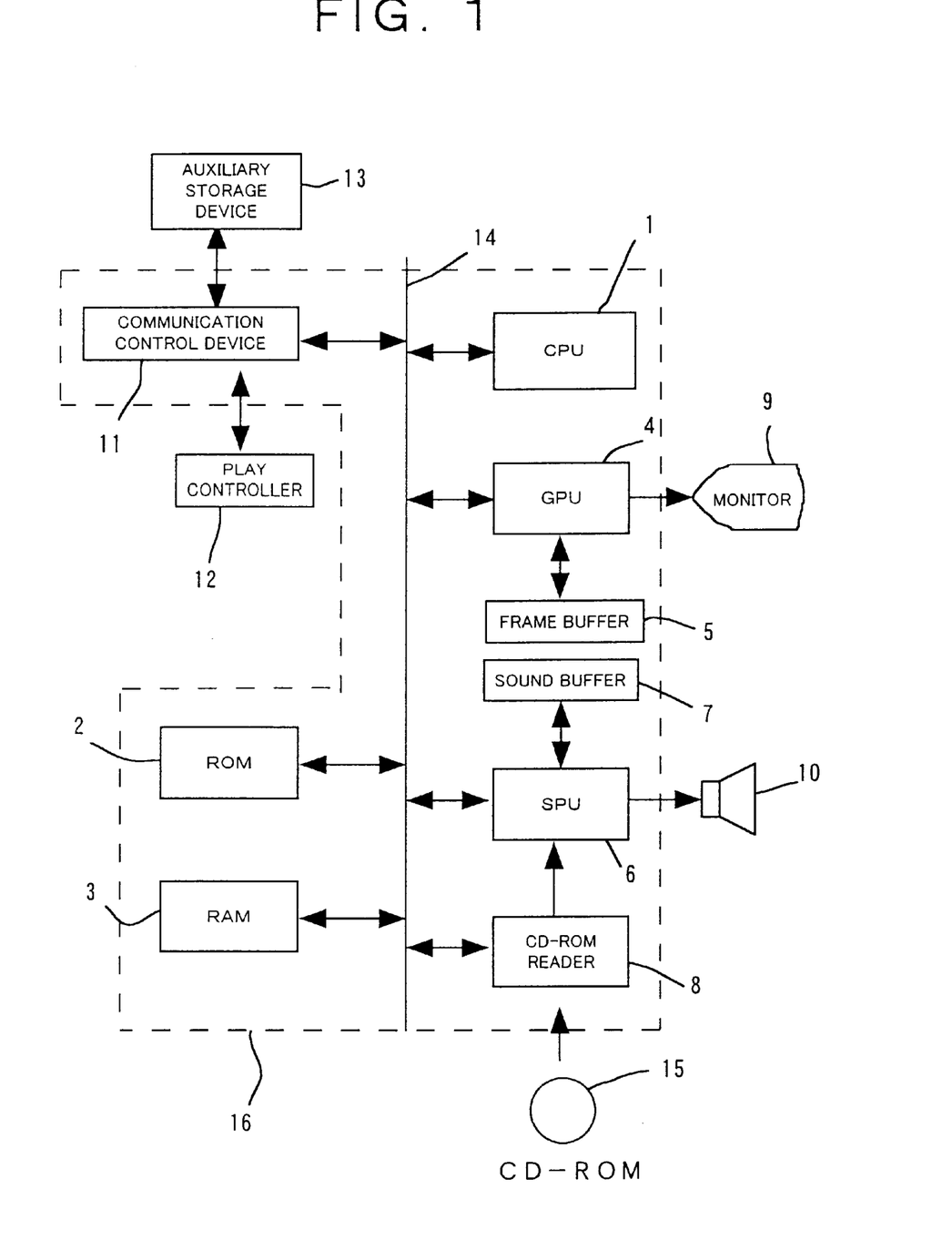
FIG. 1 is a block diagram of a control system of a golf amusement game system to which the present invention is applied.

FIG. 1 is a block diagram of a control system of a home golf amusement game system to which the present invention is applied. The home game system executes a predetermined game in accordance with game programs stored in a CD-ROM 15 functioning as a memory medium.

The game system includes a CPU 1 mainly configured by a microprocessor, a ROM 2 and a RAM 3 serving as main memory devices for the CPU 1, a graphics processing unit (GPU) 104 and a sound processing unit (SPU) 6 for executing processing needed to output visual images and sound, buffers 5 and 7 for the above units 4 and 6, and a CD-ROM reader 8. The ROM 2 stores operating system, which functions as necessary program for the overall control of the game device. Game programs and data read out from the CD-ROM 15 are written into the RAM 3, if necessary. The GPU 4 receives picture data from the CPU 1 and writes them into the frame buffer 5, converts the picture data to prescribed video reproduction signals and outputs them to the monitor 9 at appropriate timings. The SPU 6 reproduces voice and music data as well as music-source data, which are read out from the CD-ROM 15 and then stored in the sound buffer 7, so that corresponding sound is outputted by the speaker 10. The CD-ROM reader 8 reads out necessary programs and data, which are stored in the CD-ROM 15 according to the instruction by the CPU 1, and outputs signals corresponding to the programs and data thus read out. The CD-ROM 15 stores programs and data necessary for the execution of the game. These programs and data will be described later in detail. Generally, a television receiver for home use is used as the monitor 9, and a loudspeaker provided in the television receiver is used as the loudspeaker 10.

Moreover, a communication control device 11 is connected via a bus 14 to the CPU 1, and a play controller 12 and an auxiliary storage device 13 are detachably connected to the communication control device 11. The play controller 12 functions as an input device manipulated by a user who plays the game. The play controller 12 includes operation members, which are to be manipulated by the user. The communication control device 11 scans the state of the operation members of the play controller 12 at a fixed cycle (e.g. 1/60 second), and outputs signals in correspondence with the scanning result to the CPU 1. Based on these signals, the CPU 1 judges the state of the play controller 12. A plurality of controllers 12 and auxiliary storage units 13 may be connected to the communication control device 11 in parallel, at the same time.

With the above-described configuration, the components other than the monitor 9, the speaker 10, the play controller 12, the CD-ROM 15 and the auxiliary storage unit 13 are all accommodated in a single housing to constitute the home game device 16.

Controllers of various designs may be used as the controller 12. For example, a general type controller 12A shown in FIG. 2 may be used.

Figure 2A:
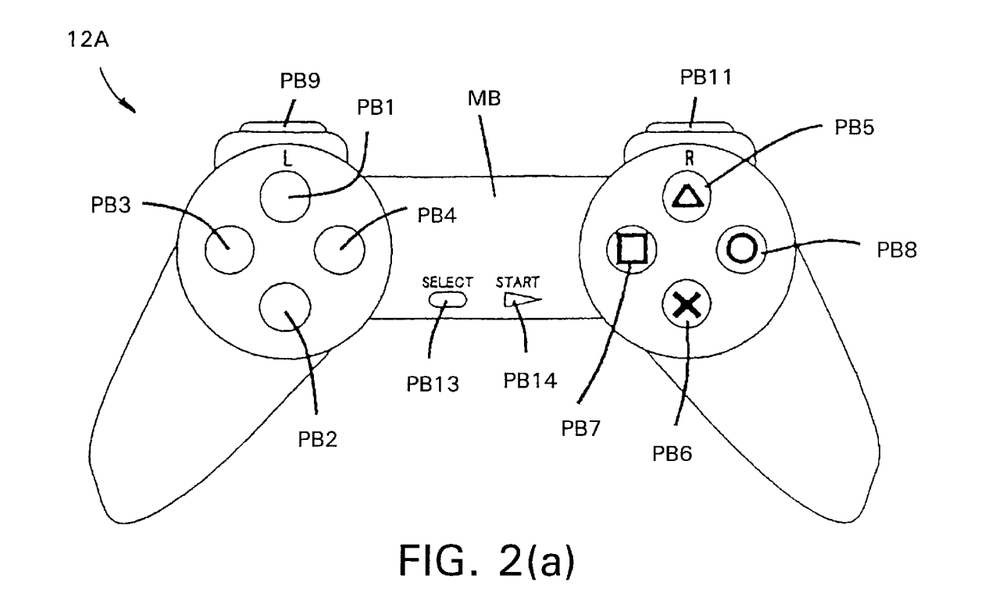
FIG. 2 is a schematic descriptive view illustrating a controller, which can be used in the golf amusement game system as shown in FIG. 1.
Figure 2B:
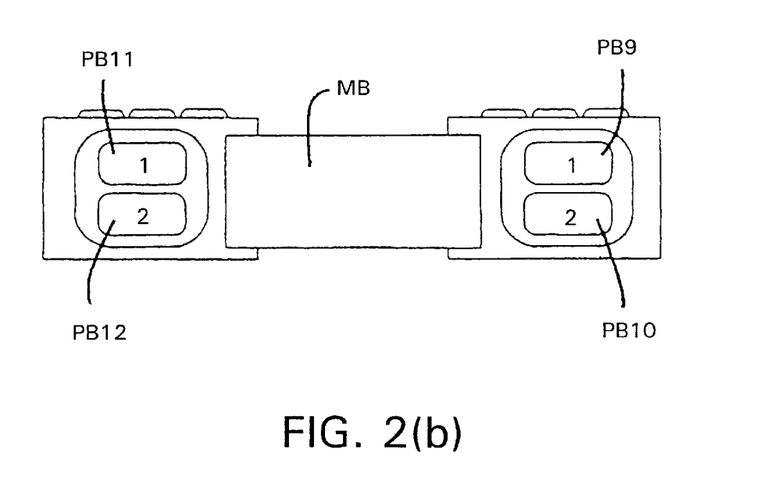

The general type controller 12A as shown in FIG. 2 may generally be used irrespective of the type of the game that the user plays. The controller 12A includes a main body MB, which is formed of synthetic resin, four push switches PB1 to PB4 and four push switches PB5 to PB8 respectively locating on the opposite sides of the main face of the main body MB, two push switches PB9 and PB10 and two push switches PB11 and PB12 respectively locating on the opposite sides of the front face of the main body MB, and small push switches PB13 and PB14 locating in the middle of the main face of the main body MB. The push switches PB1 to PB4 locating on the left-hand side are manipulated to designate the movement directions of a game character or cursor upward, downward, leftward, and rightward, respectively. These switches PB1 to PB8 may also be called as direction designation switches. Various command for playing game are assigned to the switches PB5 to PB8 locating on the right-hand side, and appropriate signs are provided on or around the push switches PB5 to PB8 so that they can be visually distinguished. In the example shown here, symbols "△", "×", "□", "○" are indicated on the push switches PB5 to PB8 respectively. Numeral "1" is indicated on each of the push switches PB9 and PB1 locating on the front side, numeral "2" is indicated on each of the push switches PB10 and PB12, a letter "L" is indicated above the push switch PB1, and a letter "R" is indicated above the push switch PB5. The switch PB9 is called as "L1 button", the switch PB10 is called as "L2 button", the switch PB11 is called as "R1 button", and the switch PB12 is called as "R2 button". The push switch PB13 is called as "select button", and the push switch PB14 is called as "start button".

Figure 3:
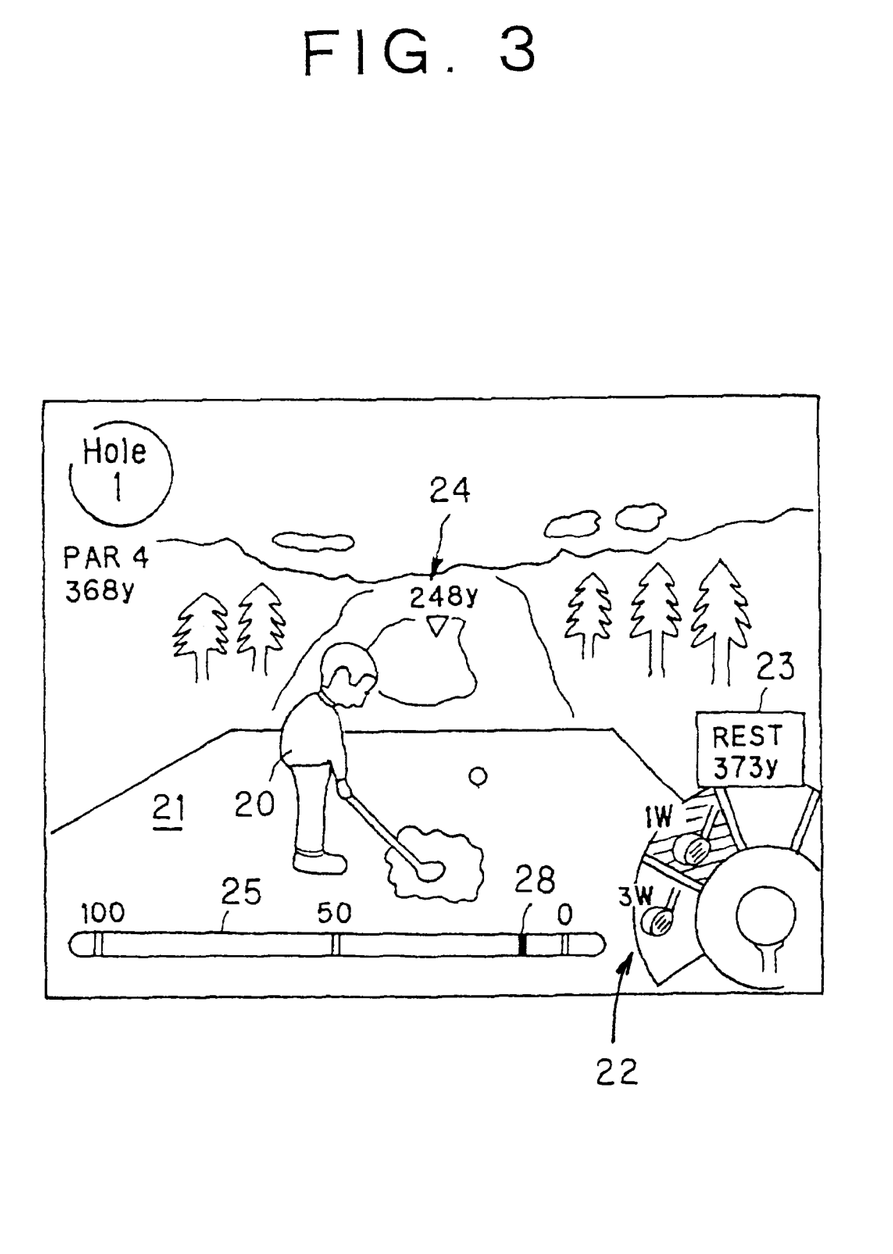
FIG. 3 is a view illustrating an example of a displayed picture when making a shot in accordance with the golf amusement game system as shown in FIG. 1.

FIG. 3 illustrates an example of a displayed picture in a shot scene in accordance with the golf amusement game system to which the present invention is applied.

The shot scene as shown in FIG. 3 is so-called a "tee shot" scene. In FIG. 3, a golfer 20 is displayed in the middle on a teeing ground 21 and a golf course spreads ahead of the golfer 20. A target point indication 24 is shown in the almost middle of the course. The target point indication 24 shows a position that a ball may reach provided that a shot is made with idealistic power and timing with the use of a golf club as currently selected.

The scene as shown in FIG. 3 has on its upper and left-hand side indicative information displayed, which includes the number of a golf course hole, the score standard therefor, the distance thereof and the like. The scene also has on its lower and right-hand side a selected-club indication portion 22 in which a driver (1W) as currently selected is highlighted by hatching. A box 23 locating above the selected-club indication portion 22 shows a distance from the golfer to a pin of the hole.

Figure 4A:
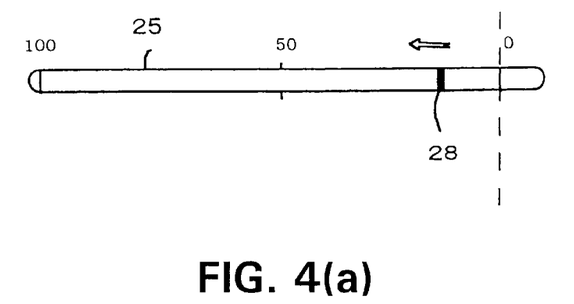
FIG. 4 is a view illustrating displayed examples of a power gauge when making a normal shot.
Figure 4B:
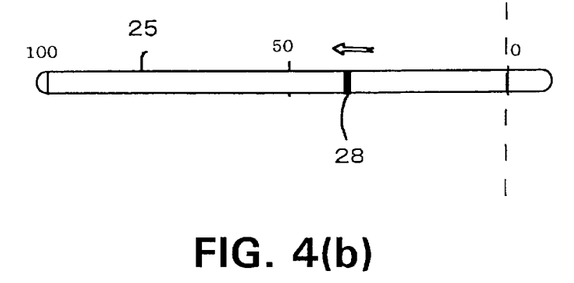
Figure 4C:
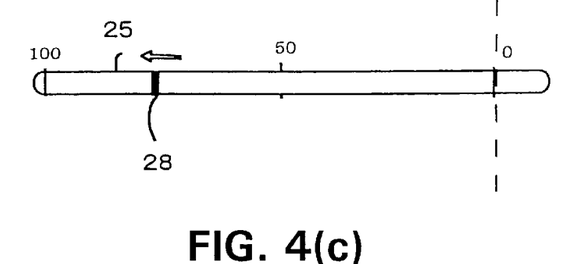

A power gauge 25, which can indicate power of shot in the form of a bar graph, locates below the golfer 20. FIG. 4 is an enlarged view of the power gauge 25. The power gauge serves as a gauge used for the purpose of determining power and timing of a shot when making the shot. The player makes a shot by operating the push button of the controller, while watching the power gauge 25. FIGS. 4(a) to 4(d) show the power gauge when making a normal shot and FIGS. 5(a) and 5(b) show the power gauge when making a power shot. The normal shot means a shot mode in which the shot is made to obtain a driving distance within standard ranges that are previously set in accordance with the respective golf clubs. On the contrary, the power shot, which is a significant feature of the present invention, means a shot mode provided as a device for increasing further the driving distance of a ball than the normal shot.

First, description will be given below of the power gauge when making a normal shot, with reference to FIGS. 4(a) to 4(d). The power gauge 25 can indicate the power value within the range of from 0% to 100% when making the normal shot. The driving distance of a ball has previously been determined for the respective kind of golf clubs (i.e., a driver, a 3-iron club or the like, which will hereinafter be referred to as the "club number") in accordance with the game system. Accordingly, in case where the maximum driving distance for the driver is determined to be 250 yards, a shot with the power of 100% leads to the driving distance of 250 yards, but a shot with the power of 50% leads to the driving distance of 125 yards.

The player has to push the push button switch PB8 of the controller as shown for example in FIG. 2(a), totally three times in order to make a shot. The first push operation corresponds to a starting operation of the shot, the second push operation corresponds to a power determination operation and the third push operation corresponds to a shot-timing determination operation. More specifically, the first push operation causes the cursor 28 to start moving in the leftward direction from the position of 0% at a constant velocity as shown in FIGS. 4(a) to 4(c). The player watches the position of the cursor on the power gauge 25 and carries out the second push operation when the cursor reaches his desired position. In case where the player wishes to make a shot with the power of 80% for example, the second push operation is carried out when the cursor 28 reaches nearly the position of 80% on the power gauge 25. The power of shot is determined in this manner.

Figure 4D:
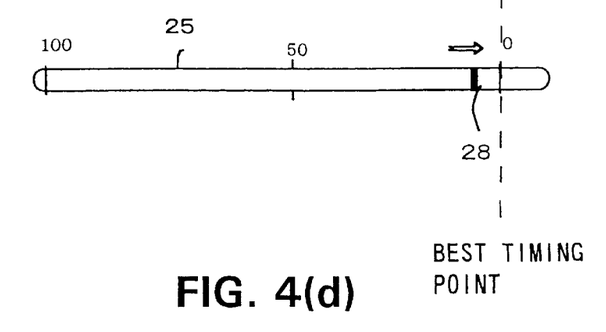
Figure 5A:
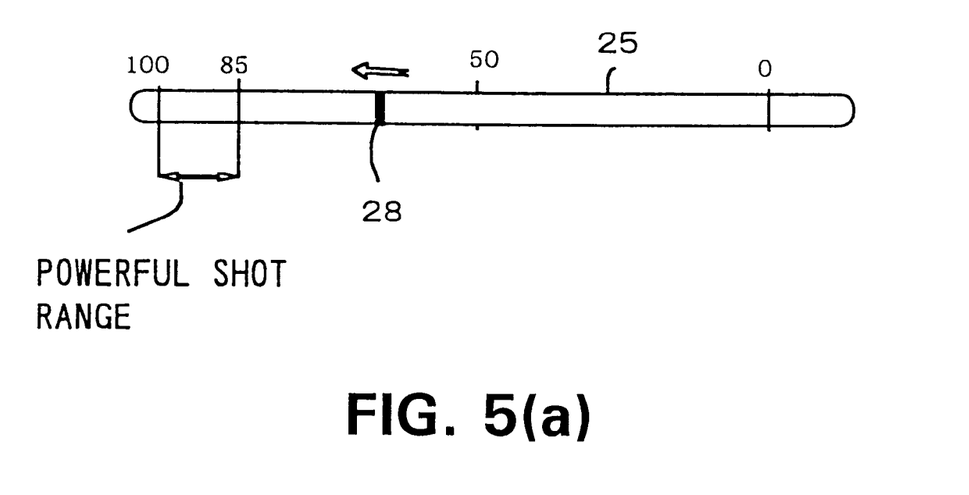
FIG. 5 is a view illustrating displayed examples of the power gauge when making a power shot.
Figure 5B:
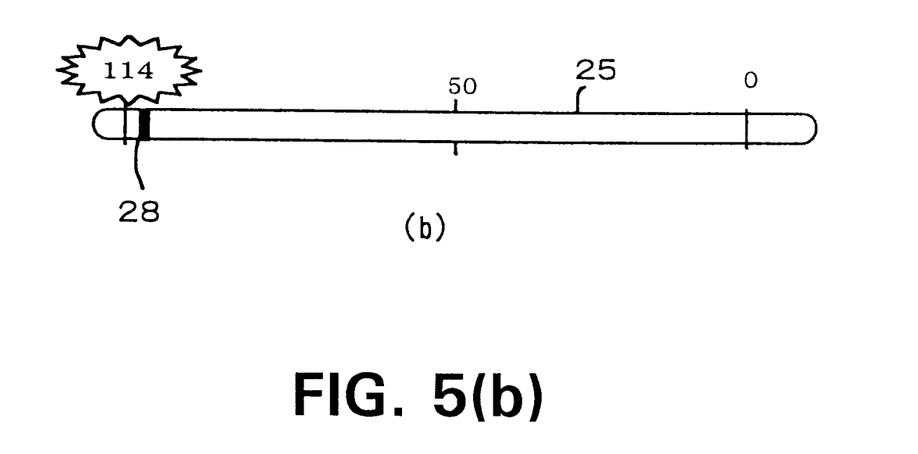

After the completion of the second push operation, the cursor 28 reaches once the left-hand end of the power gauge 25 and then starts returning in the rightward direction (i.e., toward the position of 0%) as shown in FIG. 4(d) at a constant velocity. In this case, the cursor 28 moves beyond the position of 0% of the power gauge to the right-hand end thereof unless the player carries out the third push operation. The position of 0% of the power gauge 25 also shows an optimum timing for the shot (hereinafter also referred to as the "best timing point") as shown in FIGS. 4(a) to 4(d). The player preferably carries out the third push operation when the cursor reaches the best timing point. In case where the third push operation is carried out when the cursor just reaches the best timing point, a ball is sent flying straight. In case where the third push operation is carried out after or before the cursor reaches the best timing point, a ball curves left or right to fly accordingly. Three push operations carried out by the player make a single shot in this manner.

Now, description of the power shot will be given below. FIGS. 5(a) and 5(b) illustrate displayed examples of the power gauge 25 when making a power shot. An operation for the power shot is carried out to increase further the driving distance of the ball beyond the driving distance, which is obtained by the shot with the power of 100% set for the respective golf club. More specifically, the player gives instructions on the start for a shot by carrying out the first push operation, then continues pushing the push button switch when the cursor enters the power shot range. The normal shot and the power shot are different from each other in that push of the push button switch is released immediately after the second push in the former case and, on the contrary, the push button switch is kept pushed for a while even after the second push in the latter case. The power shot range, which has previously been determined, is set for example between 85% and 100% of the power gauge as shown in FIG. 5(a). The push of the push button switch maintaining its pushed state for a while does not permit to provide shift to the power shot mode, so long as the cursor 28 is outside the power shot range. The power shot range may be set in accordance with the player's preference, thus making it possible to change difficulty in execution of the power shot.

When the cursor enters the power shot range and the player pushes the push button switch to carry out the second push operation, maintaining its pushed state for a while, the power value (which is 100% in a normal state) appearing on the left-hand end of the power gauge 25 increases as shown in FIG. 5(b) (the power value is increased to 114% in the example as shown in FIG. 5(b)). In this case, the power value increases in correspondence with a period of time during which the push button switch is kept pushed after the second push. The subsequent operations are carried out in the same manner as the normal shot. More specifically, release of push of the push button switch by the player causes the cursor 28 to turn at the left-hand end of the power gauge 25 to return rightward to the best timing point. Then, the player carries out the third push operation to determine the timing of shot when the cursor reaches nearly the best timing point. Accordingly, it is possible to obtain the driving distance beyond the maximum driving distance of the ball, which has previously determined in accordance with the club number of the respective golf club (in the example as shown in FIG. 5(b), the driving distance is increased by 14%).

It is however possible to make the constant velocity, at which the cursor 28 returns toward the best timing point after the completion of the second push for the power shot, higher than that as in the normal shot. This system is based on the concept that it is difficult to make an appropriate adjustment for impact timing against a ball according as the power with which the shot is made becomes larger. With respect to one of measures for this system, the constant velocity, at which the cursor 28 returns in the power shot mode, may be increased in a prescribed ratio to the constant velocity as in the normal shot mode. There may be adopted a system that, in the power shot mode, the cursor can return at a velocity, which is always increased further by 10% than that as in the normal shot. Alternatively, the return velocity of the cursor may be determined for example in accordance with the power value, which has been determined by the power shot. More specifically, there may be adopted a system that, when the power value determined by the power shot is 105%, the cursor returns at the velocity increased by 5%, and the power value determined thereby is 115%, the cursor returns at the velocity increased by 15%. In such a system, a timing adjustment for shot becomes difficult, according as the power increases. There may be applied many applicable measures to determine the return velocity of the cursor. There may also be adopted a measure that the amusement game system includes a plurality of procedure modes previously prepared, one of which can voluntarily be selected by the player, so that the return velocity of the cursor is determined on the basis of the selected mode.

In addition, it is possible to provide the power value increased by the power shot with its upper limit. There may be adopted a mode in which, even when the player pushes the push button switch for a long period of time after the second push, the power value does not increase over 115%, for example. In this case, the power value appearing on the left-hand end of the power gauge as shown in FIG. 5(b) does not increase over 115%, with the result that the player can recognize the power value of 115% to be the upper limit.

Thus, the adoption of the power shot mode makes it possible to obtain the driving distance exceeding the maximum driving distance, which is obtained in the normal shot mode, resulting in realization of a golf play satisfying the desire of an actual golfer of sending a golf ball flying as further as possible. On the other hand, when the return velocity of the cursor is set to be higher in the power shot mode so as to make determination of timing for the shot difficult, there is provided a risky mode in which a long drive of a ball may be achieved with an increased probability of making a miss shot, thus enhancing a strategic interest in the amusement game.

Figure 6:
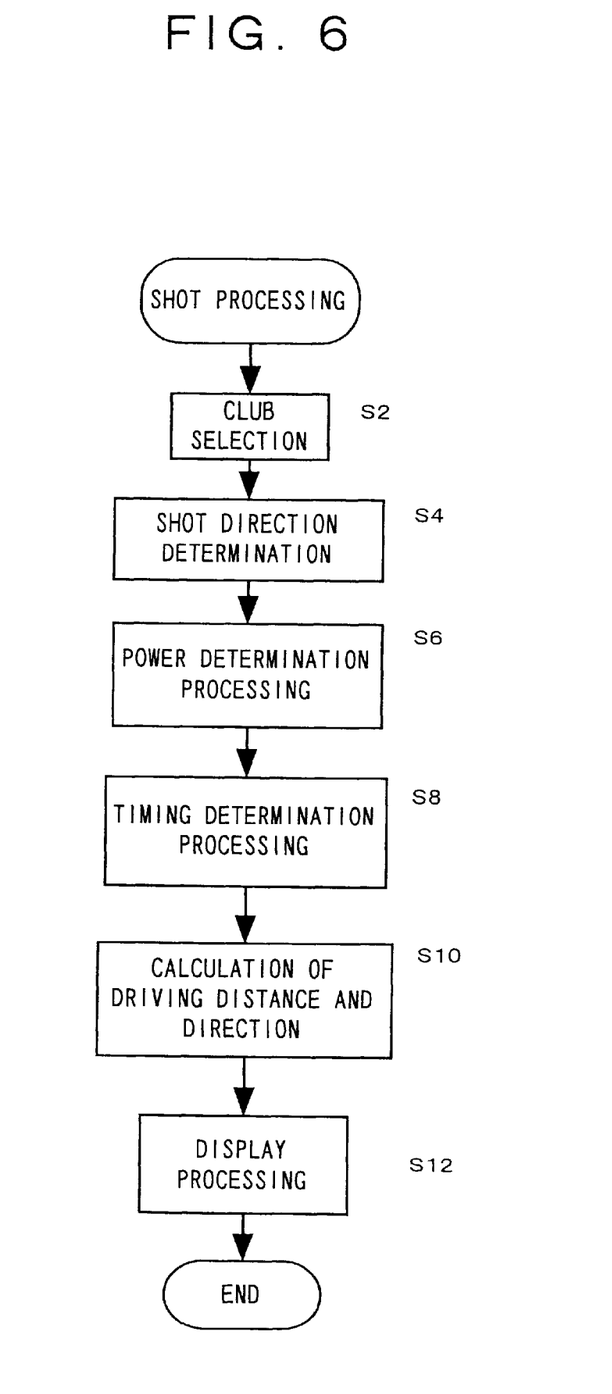
FIG. 6 is a flowchart illustrating a shot process in the golf amusement game system as shown in FIG. 1.
Figure 7:
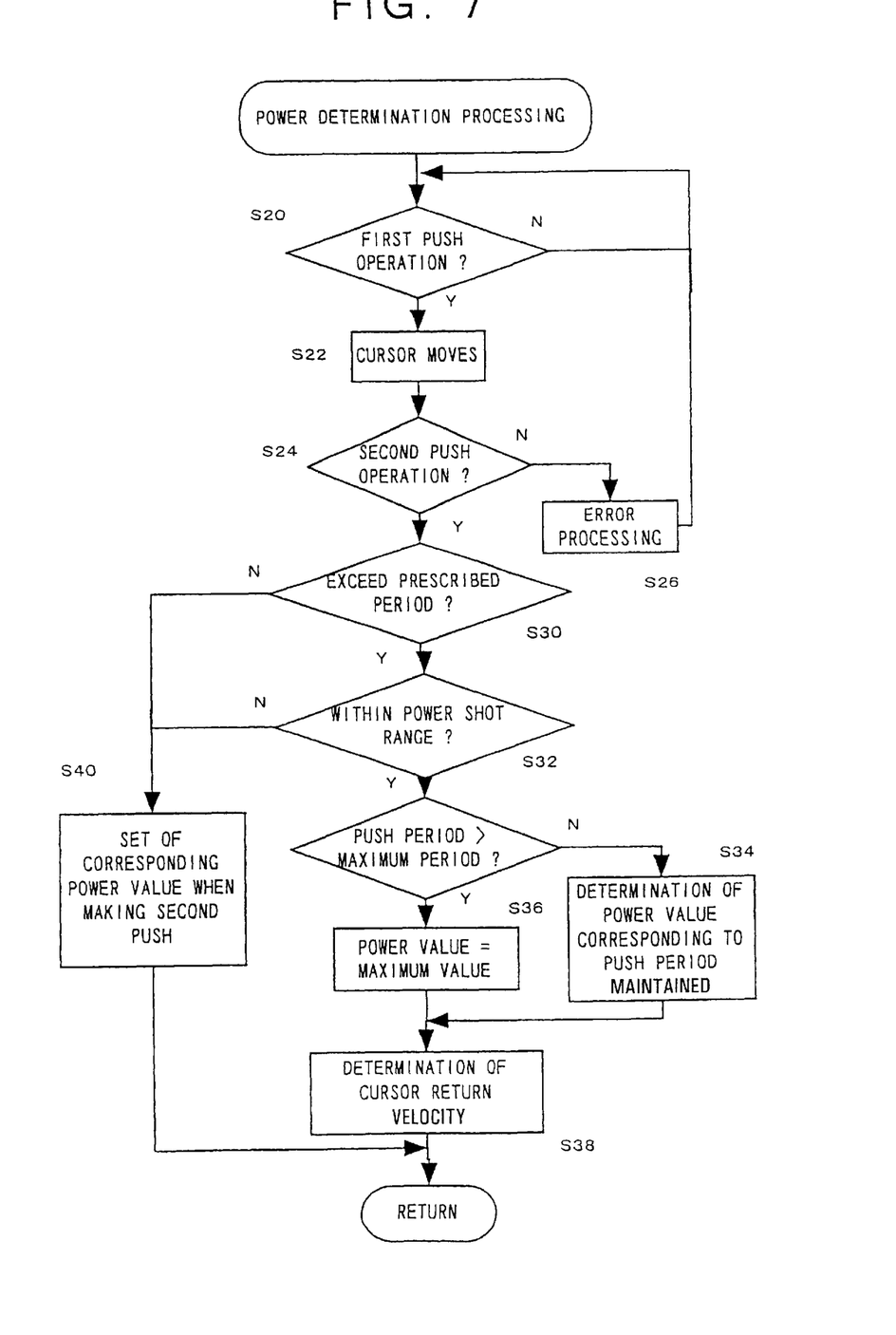
FIG. 7 is a flowchart illustrating a power determination process included in the shot process as shown in FIG. 6.

Now, a shot processing by the player will be described below with reference to flowcharts as shown in FIGS. 6 and 7. FIG. 6 shows a main routine for the shot processing and FIG. 7 shows a sub routine for the power determination processing as shown in FIG. 6. The processing described below is read out from the CD-ROM 15 as shown in FIG. 1 and is executed on the game program loaded into the RAM 3. More specifically, the communication control device 11 detects the instruction and determination, which are mainly carried out by operating the controller 12A by the player. The CPU 1 processes the detected results on the basis of the program and data stored in the RAM 3 to carry out execution.

With reference to FIG. 6, the player first selects a club (Step S2). Operation of the prescribed push button switch controller 12A by the player carries out this step. Operation of the controller 12A permits to make a change in club, which is selected currently (i.e., highlighted by hatching) in the selected-club indication portion 22 as shown in FIG. 3. The player operates the controller 12A to select and determine his desired club. The CPU 1 makes reference to data for designating the selected club, which data have previously been loaded into the RAM 3. These data include information such as the maximum driving distance corresponding to the selected club.

Then, the player makes a change in direction of the golfer 20 to determine the direction of a shot, while watching the displayed picture as shown in FIG. 3 (Step S4). Operation of the prescribed push button switch of the controller 12A by the player also carries out this step. The CPU 1 causes the RAM 3 to store temporarily the data for designating the direction thus determined.

Then, the player carries out the power determination processing (Step S6). The power determination processing, which determines the power of a shot, will be described in detail with reference to FIG. 7. First, the CPU 1 judges as whether or not the first push operation of the prescribed push button switch of the controller 12A has been carried out (Step S20). The first push operation corresponds to the start operation for the shot. As a result, when the first push operation has not been carried out as yet, the CPU 1 stands by until the first push operation is carried out. After detection of completion of the first push operation, the CPU 1 controls the GPU 4 and the like as shown in FIG. 4(b) to move the cursor 28 leftward on the power gauge 25 at a constant velocity (Step S22).

The player watches the cursor 28 moving on the power gauge 25, and carries out the second push operation when the cursor 28 reaches nearly the prescribed value of power. The second push operation corresponds to the power determination operation. The CPU 1 judges as whether or not the second push operation has been carried out (Step S24). No detection of the second push operation is regarded as an operation failure occurred, to carry out a prescribed error processing (Step S26), resulting in return to Step S20 in the processing. After detection of the second push operation, there is judged on the other hand as whether the second push operation continues for at least a prescribed period of time (i.e., the push button switch is kept pushed) (Step S28).

When the second push operation continues for at least the prescribed period of time, then the CPU 1 judges whether or not the second push operation is carried out when the cursor 28 enters the power shot range (Step S30). In case where the second push operation continues for at least the prescribed period of time when the cursor 28 enters the power shot range, the CPU 1 judges that the player gives the instruction on the power shot. The CPU 1 judges as whether the period of time, during which the second push operation is carried out, exceeds the prescribed period of time (Step S32). It is possible to provide the upper limit for the increased amount of power value for the power shot, as described above. Accordingly, when continuous time for the second push operation exceeds the prescribed period of time, the power value for the power shot is set as the prescribed maximum power value (i.e., 115% in the above-described example) (Step S36). When the continuous time for the second push operation does not exceed the prescribed period of time, the power value is increased by a value corresponding to the continuous time for the second push operation (Step S34). The power value (i.e. the displayed value) appearing on the left-hand end of the power gauge increases as shown in FIG. 5(b) during the continuous operation of the second push by the player in the power shot mode, as described above. Accordingly, the player can release the push of the push button switch when the desired power value is obtained. The power value for the power shot is determined in this manner.

Then, the CPU 1 determines the return velocity of the cursor on the basis of the increased amount of power value as determined (Step S38). This step is to make the return velocity of the cursor in the power shot mode higher than that as in the normal shot mode. Determination measures of the velocity are described above. The power value in the power shot mode is determined in this manner and a processing for making the return velocity of the cursor higher is carried out, resulting in completion of the power determination processing.

When there is made a judgement that the continuous time for the second push operation does not exceed the prescribed period of time in Step S28, or a judgement that the second push operation is carried out outside the power shot range in Step S30, shift to the power shot mode is not provided and the process is executed in the form of the normal shot mode. Accordingly, the corresponding power value is determined during the second push operation (Step S40), resulting in completion of the power determination processing.

Completion of the power determination processing results in return to the main routine as shown in FIG. 6 in the processing and the CPU 1 carries out the timing determination processing (Step S8). The timing determination processing is to detect the third push operation by the player and determine time difference between the detected timing and the timing of the best timing point.

After the determination of the shot direction, the power value and the time difference in timing for the shot, the CPU 1 calculates and determines the driving distance and the direction of a virtual ball (Step S10) and controls the GPU 4 and the like to carry out a processing for displaying a scene in which the ball is flying, on the game screen on the basis of the results obtained (Step S12). The driving distance of the ball is normally calculated on the basis of the maximum distance corresponding to the club currently selected and the power of shot. A calculation is made so that the detected timing being behind the best timing point causes the ball to turn left and the detected timing being before it causes the ball to turn right. Such a calculation is known and description thereof in further detail will be omitted. The processing for the single shot is completed in this manner. The player repeats the shot processing described above to advance the amusement game.

According to the golf amusement game of the present invention as described above in detail, it is possible to realize the long drive of the ball, which cannot be provided in the normal shot mode, by adopting the power shot mode. The power shot mode includes a risk that a long drive of the ball may be achieved, although it is difficult to make a shot with a good timing, thus further enhancing a strategic interest in the amusement game.

In the above-mentioned embodiment, the present invention is applied to a shot of the golf amusement game. Application of the present invention is not limited only to it and the present invention can be applied to the other kind of amusement game. A throwing system utilizing the same power gauge is adopted for example in the discus throw, the shot-put or the like in the sports amusement game including athletics. It is also applied to an amusement game of a competition such as archery, quoits or the like in which an object is sent flying to a prescribed target. In addition, the power gauge system of the present invention may be applied for example to casting in an amusement fishing game.

With respect to application to a game other than the golf amusement game, when the movement direction of an object is previously determined and competition is to be made only for the movement distance, operation for moving the object may comprise only two operations, i.e., an initial start operation and a movement power determination operation.

In the above-described embodiment, the power gauge is displayed in the form of combination of the bar graph extending horizontally with the cursor movable leftward or rightward on the bar graph. The power gauge may however be displayed for example in the form of combination of a circle graph with a cursor capable of turning, like the second hand, on the circle graph, or in the other form.

According to the present invention as described in detail, it is possible to obtain the movement distance, which cannot be obtained by the normal operation, in a type of amusement game, in which an object is moved for example by a shot in a golf amusement game. When timing determination is set to be difficult in return for a long movement distance obtainable, the strategy of amusement game can be enhanced.

What is claimed is:

1. An amusement game system comprising:
 a display device for a picture;
 an input device for outputting signals according to operation by a player; and
 a control device for causing an amusement game to progress and displaying the picture according to a progress of the amusement game on a screen of said display device, said amusement game including a step for moving an object in a virtual field based on output from said input device, wherein:
 said control device comprises:
  a first-instruction detection device for detecting a first instruction which has been input by the player with a use of said input device;
  a movement power display device for displaying movement power of said object within a range up to a predetermined maximum value of movement power by means of a graph and a cursor movable on said graph;
  a first cursor-movement device for moving said cursor on said graph in a direction indicating said maximum value of movement power in accordance with a lapse of time from a point of time when said first instruction has been detected;
  a second-instruction detection device for detecting a second instruction which has been input by the player with the use of said input device;
  a movement power determination device for determining the movement power of said object on a basis of a lapse of time from the point of time when said first instruction has been detected to a point of time when said second instruction has been detected;
  a movement device for moving said object in the virtual field in accordance with the movement power thus determined;
  a second cursor-movement device for moving said cursor toward a standard position on said graph, after detection of said second instruction;
  a movement power increase device for increasing said movement power in accordance with a time period during which the second instruction is continuously detected when said second instruction is continuously detected for at least a prescribed period of time;
  a third-instruction detection device for detecting a third instruction which has been input by the player with the use of said input device; and
  a movement direction factor determination device for determining a factor associated with a movement direction of said object, in accordance with timing at which said cursor reaches said standard position and with timing at which said third instruction is input,
 wherein said second cursor-movement device moves said cursor at a speed which is higher than the speed when said movement power increase device does not increase the movement power and which is determined in accordance with an increased amount of the movement power by the movement power increase device, in case where said movement power increase device increases the movement power, and
 wherein said movement device moves said object in said virtual field in accordance with said movement power as determined and said factor associated with the movement direction of said object.

2. The amusement game system as claimed in claim 1, wherein the movement power increase device increases the movement power beyond the maximum value of the movement power.

3. The amusement game system as claimed in claim 1, wherein said movement power increase device increases said movement power only in case where said second instruction is input when said cursor is positioned within a power-shot range defined between the maximum value of movement power and a predetermined power value smaller than the maximum value of movement power.

4. An amusement game system comprising:

a display device for a picture;

an input device outputting signals according to operation by a player; and a control device for causing a golf amusement game to progress and displaying the picture according to a progress of the amusement game on a screen of said display device, said golf amusement game including a step for hitting a ball to send it flying toward a target in a virtual field based on the output of said input device, wherein:

said control device comprises:

a first-instruction detection device for detecting a first instruction which has been input by the player with a use of said input device;

a hit power display device for displaying hit power of said ball within a range up to a predetermined maximum value of hit power by means of a graph and a cursor movable on said graph;

a first cursor-movement device for moving said cursor on said graph in a direction indicating said maximum value of hit power in correspondence with a lapse of time from a point of time when said first instruction has been detected;

a second-instruction detection device for detecting a second instruction which has been input by the player with the use of said input device;

a hit power determination device for determining the hit power of said ball on a basis of a lapse of time from the point of time when said first instruction has been detected to a point of time when said second instruction has been detected;

a movement device for moving said ball in the virtual field in accordance with the hit power thus determined;

a second cursor-movement device for moving said cursor toward a standard position on said graph, after detection of said second instruction;

a hit power increase device for increasing said hit power in accordance with a time period during which the second instruction is continuously detected when said second instruction is continuously detected for at least a prescribed period of time;

a third-instruction detection device for detecting a third instruction which has been input by the player with the use of said input device; and a movement direction factor determination device for determining a factor associated with a movement direction of said ball, in accordance with timing at which said cursor reaches said standard position and with timing at which said third instruction is input, wherein said second cursor-movement device moves said cursor at a speed which is higher than the speed when said hit power increase device does not increase the hit power and which is determined in accordance with an increased amount of the hit power by the hit power increase device, in case where said hit power increase device increases the hit power, and wherein, said movement device moves said ball in said virtual field in accordance with said hit power as determined and said factor associated with the movement direction of said ball.

5. The amusement game system as claimed in claim 4, wherein the hit power increase device increases the hit power beyond the maximum value of the hit power.

6. The amusement game system as claimed in claim 4, wherein said hit power increase device increases said hit power only in case where said second instruction is input when said cursor is positioned within a power-shot range defined between the maximum value of hit power and a predetermined power value smaller than the maximum value of hit power.

7. A computer-readable storage medium comprising a program stored therein, said program causing an amusement game to progress and displaying a picture according to a progress of the amusement game on a screen of a display device, said amusement game including a step for moving an object in a virtual field based on output from an input device of an amusement game apparatus, wherein:

said program causes a computer provided in said amusement game apparatus to function respectively as:

a first-instruction detection device for detecting a first instruction which has been input by a player with a use of said input device;

a movement power display device for displaying movement power of said object within a range up to a predetermined maximum value of movement power by means of a graph and a cursor movable on sand graph;

a first cursor-movement device for moving said cursor on said graph in a direction indicating said maximum value of movement power in accordance with a lapse of time from a point of time when said first instruction has been detected;

a second-instruction detection device for detecting a second instruction which has been input by the player with the use of said input device;

a movement power determination device for determining the movement power of said object on a basis of a lapse of time from the point of time when said first instruction has been detected to a point of time when said second instruction has been detected;

a movement device for moving said object in the virtual field in accordance with the movement power thus determined;

a second cursor-movement device for moving said cursor toward a standard position on said graph, after detection of said second instruction;

a movement power increase device for increasing said movement power in accordance with a time period during which the second instruction is continuously detected when said second instruction is continuously detected for at least a prescribed period of time;

a third-instruction detection device for detecting a third instruction which has been input by the player with the use of said input device; and a movement direction factor determination device for determining a factor associated with a movement direction of said object, in accordance with timing at which said cursor reaches said standard position and with timing at which said third instruction is input, wherein said second cursor-movement device moves said cursor at a speed which is higher than the speed when said movement power increase device does not increase the movement power and which is determined in accordance with an increased amount of the movement power by the movement power increase device, in case where said movement power increase device increases the movement power, and wherein said movement device moves said object in said virtual field in accordance with said movement power as determined and said factor associated with the movement direction of said object.

8. The medium as claimed in claim 7, wherein the movement power increase device increases the movement power beyond the maximum value of the movement power.

9. The medium as claimed in claim 7, wherein said movement power increase device increases said movement power only in case where said second instruction is input when said cursor is positioned within a power-shot range defined between the maximum value of movement power and a predetermined power value smaller than the maximum value of movement power.

10. A computer-readable storage medium comprising a program stored therein, said program causing a golf amusement game to progress and displaying a picture according to a progress of the amusement game on a screen of a display device, said golf amusement game including a step for hitting a ball to send it flying toward a target in a virtual field based on output from an input device of an amusement game apparatus, wherein:

said program causes a computer provided in said amusement game apparatus to function respectively as:

a first-instruction detection device for detecting a first instruction which has been input by a player with a use of said input device;

a hit power display device for displaying hit power of said ball within a range up to a predetermined maximum value of hit power by means of a graph and a cursor movable on said graph;

a first cursor-movement device for moving said cursor on said graph in a direction indicating said maximum value of hit power in accordance with a lapse of time from a point of time when sand first instruction has been detected;

a second-instruction detection device for detecting a second instruction which has been input by the player with the use of said input device;

a hit power determination device for determining the hit power of said ball on a basis of a lapse of time from the point of time when said first instruction has been detected to a point of time when said second instruction has been detected;

a movement device for moving said ball in the virtual field in accordance with the hit power thus determined;

a second cursor-movement device for moving said cursor toward a standard position on said graph, after detection of said second instruction;

a hit power increase device for increasing said hit power in accordance with a time period during which the second instruction is continuously detected when said second instruction is continuously detected for at least a prescribed period of time;

a third-instruction detection device for detecting a third instruction which has been input by the player with the use of said input device; and a movement direction factor determination device for determining a factor associated with a movement direction of said ball, in accordance with timing at which said cursor reaches said standard position and with timing at which said third instruction is input, wherein said second cursor-movement device mores said cursor at a speed which is higher than the speed when said hit power increase device does not increase the hit power and which is determined in accordance with an increased amount of the hit power by the hit power increase device, in case where said hit power increase device increases the hit power, and wherein said movement device moves said ball in said virtual field in accordance with said hit power as determined and said factor associated with the movement direction of said ball.

11. The medium as claimed in claim 10, wherein the hit power increase device increases the hit power beyond the maximum value of the hit power.

12. The medium as claimed in claim 10, wherein: said hit power increase device increases said hit power only in case where said second instruction is input when said cursor is positioned within a power-shot range defined between the maximum value of hit power and a predetermined power value smaller than the maximum value of hit power.

* * * * *